(12) United States Patent
Tarlano

(10) Patent No.: US 6,484,167 B1
(45) Date of Patent: Nov. 19, 2002

(54) METHOD AND APPARATUS FOR PROVIDING CALENDAR YEAR DATES BY FORMING HEXADECIMAL DATES HAVING TWO DIGITS

(76) Inventor: John P. Tarlano, 6912 Sydenstricker Rd., Springfield, VA (US) 22152

( * ) Notice: Subject to any disclaimer, the term of this patent is extended or adjusted under 35 U.S.C. 154(b) by 627 days.

(21) Appl. No.: 08/968,472

(22) Filed: Nov. 12, 1997

(51) Int. Cl.⁷ .............................................. G06F 17/18
(52) U.S. Cl. ......................................... 707/6; 707/101
(58) Field of Search .......................... 707/101, 6, 201, 707/533; 341/82, 83, 84, 85; 364/744, 771, 77; 395/704, 705; 705/25; 714/7; 345/963; 708/530

(56) References Cited

U.S. PATENT DOCUMENTS

| | | | | | |
|---|---|---|---|---|---|
| 5,644,762 A | * | 7/1997 | Soeder | ............................ | 707/6 |
| 5,668,989 A | * | 9/1997 | Mao | ............................ | 707/101 |
| 5,737,735 A | * | 4/1998 | Soeder | ............................ | 707/6 |
| 5,758,336 A | * | 5/1998 | Brady | ............................ | 707/6 |
| 5,806,063 A | * | 9/1998 | Dickens | ............................ | 707/6 |
| 5,808,889 A | * | 9/1998 | Burgess | ............................ | 345/963 |
| 5,812,841 A | * | 9/1998 | Soeder | ............................ | 707/6 |
| 5,903,895 A | * | 5/1999 | Hoffman et al. | ............................ | 707/101 |

OTHER PUBLICATIONS

Ross A. Overbeek and W.E. Singletary, "Assembler Language With Assist," Second Edition, pp. 1–22 and 248–303, 1983.*

* cited by examiner

*Primary Examiner*—Wayne Amsbury
*Assistant Examiner*—Thu-Thao Havan

(57) ABSTRACT

Method and apparatus for providing calendar year dates that increase upward from 2000, by forming a series of hexadecimal dates, each hexadecimal date having two digits, each digit being four binary bits, the binary bits being placed in two memory block, each memory block having four memory locations for holding four binary bits, and relating the hexadecimal dates to calendar year dates that increase upward from 2000.

9 Claims, 7 Drawing Sheets

| CALENDAR DATE VALUE | HEXADECIMAL DATE | BITS IN X | | | | BITS IN Y | | | |
|---|---|---|---|---|---|---|---|---|---|
| | | X1 | X2 | X3 | X4 | Y1 | Y2 | Y3 | Y4 |
| (19)99 | 99 | 1 | 0 | 0 | 1 | 1 | 0 | 0 | 1 |
| 2000 | 9A | 1 | 0 | 0 | 1 | 1 | 0 | 1 | 0 |
| 2001 | 9B | 1 | 0 | 0 | 1 | 1 | 0 | 1 | 1 |
| 2002 | 9C | 1 | 0 | 0 | 1 | 1 | 1 | 0 | 0 |
| 2003 | 9D | 1 | 0 | 0 | 1 | 1 | 1 | 0 | 1 |
| 2004 | 9E | 1 | 0 | 0 | 1 | 1 | 1 | 1 | 0 |
| 2005 | 9F | 1 | 0 | 0 | 1 | 1 | 1 | 1 | 1 |
| 2006 | A6 | 1 | 0 | 1 | 0 | 0 | 1 | 1 | 0 |
| 2007 | A7 | 1 | 0 | 1 | 0 | 0 | 1 | 1 | 1 |
| 2008 | A8 | 1 | 0 | 1 | 0 | 1 | 0 | 0 | 0 |
| 2009 | A9 | 1 | 0 | 1 | 0 | 1 | 0 | 0 | 1 |
| 2010 | AA | 1 | 0 | 1 | 0 | 1 | 0 | 1 | 0 |
| 2011 | AB | 1 | 0 | 1 | 0 | 1 | 0 | 1 | 1 |
| 2012 | AC | 1 | 0 | 1 | 0 | 1 | 1 | 0 | 0 |

| CALENDAR DATE VALUE | HEXADECIMAL DATE | BITS IN X | | | | BITS IN Y | | | |
|---|---|---|---|---|---|---|---|---|---|
| | | X1 | X2 | X3 | X4 | Y1 | Y2 | Y3 | Y4 |
| (19)99 | 99 | 1 | 0 | 0 | 1 | 1 | 0 | 0 | 1 |
| 2000 | 9A | 1 | 0 | 0 | 1 | 1 | 0 | 1 | 0 |
| 2001 | 9B | 1 | 0 | 0 | 1 | 1 | 0 | 1 | 1 |
| 2002 | 9C | 1 | 0 | 0 | 1 | 1 | 1 | 0 | 0 |
| 2003 | 9D | 1 | 0 | 0 | 1 | 1 | 1 | 0 | 1 |
| 2004 | 9E | 1 | 0 | 0 | 1 | 1 | 1 | 1 | 0 |
| 2005 | 9F | 1 | 0 | 0 | 1 | 1 | 1 | 1 | 1 |
| 2006 | A6 | 1 | 0 | 1 | 0 | 0 | 1 | 1 | 0 |
| 2007 | A7 | 1 | 0 | 1 | 0 | 0 | 1 | 1 | 1 |
| 2008 | A8 | 1 | 0 | 1 | 0 | 1 | 0 | 0 | 0 |
| 2009 | A9 | 1 | 0 | 1 | 0 | 1 | 0 | 0 | 1 |
| 2010 | AA | 1 | 0 | 1 | 0 | 1 | 0 | 1 | 0 |
| 2011 | AB | 1 | 0 | 1 | 0 | 1 | 0 | 1 | 1 |
| 2012 | AC | 1 | 0 | 1 | 0 | 1 | 1 | 0 | 0 |

*FIG. 2A*

| CALENDAR DATE VALUE | HEXADECIMAL DATE | BITS INX | | | | BITS INY | | | |
|---|---|---|---|---|---|---|---|---|---|
| | | X1 | X2 | X3 | X4 | Y1 | Y2 | Y3 | Y4 |
| 2013 | AD | 1 | 0 | 1 | 0 | 1 | 1 | 0 | 1 |
| 2014 | AE | 1 | 0 | 1 | 0 | 1 | 1 | 1 | 0 |
| 2015 | AF | 1 | 0 | 1 | 0 | 1 | 1 | 1 | 1 |
| 2016 | B6 | 1 | 0 | 1 | 1 | 0 | 1 | 1 | 0 |
| 2017 | B7 | 1 | 0 | 1 | 1 | 0 | 1 | 1 | 1 |
| 2018 | B8 | 1 | 0 | 1 | 1 | 1 | 0 | 0 | 0 |
| 2019 | B9 | 1 | 0 | 1 | 1 | 1 | 0 | 0 | 1 |
| 2020 | BA | 1 | 0 | 1 | 1 | 1 | 0 | 1 | 0 |
| 2021 | BB | 1 | 0 | 1 | 1 | 1 | 0 | 1 | 1 |
| 2022 | BC | 1 | 0 | 1 | 1 | 1 | 1 | 0 | 0 |
| 2023 | BD | 1 | 0 | 1 | 1 | 1 | 1 | 0 | 1 |
| 2024 | BE | 1 | 0 | 1 | 1 | 1 | 1 | 1 | 0 |
| 2025 | BF | 1 | 0 | 1 | 1 | 1 | 1 | 1 | 1 |
| 2026 | C6 | 1 | 1 | 0 | 0 | 0 | 1 | 1 | 0 |
| 2027 | C7 | 1 | 1 | 0 | 0 | 0 | 1 | 1 | 1 |

*FIG. 2B*

| CALENDAR DATE VALUE | HEXADECIMAL DATE | BITS INX | | | | BITS INY | | | |
|---|---|---|---|---|---|---|---|---|---|
| | | X1 | X2 | X3 | X4 | Y1 | Y2 | Y3 | Y4 |
| 2028 | C8 | 1 | 1 | 0 | 0 | 1 | 0 | 0 | 0 |
| 2029 | C9 | 1 | 1 | 0 | 0 | 1 | 0 | 0 | 1 |
| 2030 | CA | 1 | 1 | 0 | 0 | 1 | 0 | 1 | 0 |
| 2031 | CB | 1 | 1 | 0 | 0 | 1 | 0 | 1 | 1 |
| 2032 | CC | 1 | 1 | 0 | 0 | 1 | 1 | 0 | 0 |
| 2033 | CD | 1 | 1 | 0 | 0 | 1 | 1 | 0 | 1 |
| 2034 | CE | 1 | 1 | 0 | 0 | 1 | 1 | 1 | 0 |
| 2035 | CF | 1 | 1 | 0 | 0 | 1 | 1 | 1 | 1 |
| 2036 | D6 | 1 | 1 | 0 | 1 | 0 | 1 | 1 | 0 |
| 2037 | D7 | 1 | 1 | 0 | 1 | 0 | 1 | 1 | 1 |
| 2038 | D8 | 1 | 1 | 0 | 1 | 1 | 0 | 0 | 0 |
| 2039 | D9 | 1 | 1 | 0 | 1 | 1 | 0 | 0 | 1 |
| 2040 | DA | 1 | 1 | 0 | 1 | 1 | 0 | 1 | 0 |
| 2041 | DB | 1 | 1 | 0 | 1 | 1 | 0 | 1 | 1 |
| 2042 | DC | 1 | 1 | 0 | 1 | 1 | 1 | 0 | 0 |
| 2043 | DD | 1 | 1 | 0 | 1 | 1 | 1 | 0 | 1 |

*FIG. 2C*

| CALENDAR DATE VALUE | HEXADECIMAL DATE | BITS INX | | | | BITS INY | | | |
|---|---|---|---|---|---|---|---|---|---|
| | | X1 | X2 | X3 | X4 | Y1 | Y2 | Y3 | Y4 |
| 2044 | DE | 1 | 1 | 0 | 1 | 1 | 1 | 1 | 0 |
| 2045 | DF | 1 | 1 | 0 | 1 | 1 | 1 | 1 | 1 |
| 2046 | E6 | 1 | 1 | 1 | 0 | 0 | 1 | 1 | 0 |
| 2047 | E7 | 1 | 1 | 1 | 0 | 0 | 1 | 1 | 1 |
| 2048 | E8 | 1 | 1 | 1 | 0 | 1 | 0 | 0 | 0 |
| 2049 | E9 | 1 | 1 | 1 | 0 | 1 | 0 | 0 | 1 |
| 2050 | EA | 1 | 1 | 1 | 0 | 1 | 0 | 1 | 0 |
| 2051 | EB | 1 | 1 | 1 | 0 | 1 | 0 | 1 | 1 |
| 2052 | EC | 1 | 1 | 1 | 0 | 1 | 1 | 0 | 0 |
| 2053 | ED | 1 | 1 | 1 | 0 | 1 | 1 | 0 | 1 |
| 2054 | EE | 1 | 1 | 1 | 0 | 1 | 1 | 1 | 0 |
| 2055 | EF | 1 | 1 | 1 | 0 | 1 | 1 | 1 | 1 |
| 2056 | F6 | 1 | 1 | 1 | 1 | 0 | 1 | 1 | 0 |
| 2057 | F7 | 1 | 1 | 1 | 1 | 0 | 1 | 1 | 1 |
| 2058 | F8 | 1 | 1 | 1 | 1 | 1 | 0 | 0 | 0 |
| 2059 | F9 | 1 | 1 | 1 | 1 | 1 | 0 | 0 | 1 |

*FIG. 2D*

| CALENDAR DATE VALUE | HEXADECIMAL DATE | BITS INX | | | | BITS INY | | | |
|---|---|---|---|---|---|---|---|---|---|
| | | X1 | X2 | X3 | X4 | Y1 | Y2 | Y3 | Y4 |
| 2060 | FA | 1 | 1 | 1 | 1 | 1 | 0 | 1 | 0 |
| 2061 | FB | 1 | 1 | 1 | 1 | 1 | 0 | 1 | 1 |
| 2062 | FC | 1 | 1 | 1 | 1 | 1 | 1 | 0 | 0 |
| 2063 | FD | 1 | 1 | 1 | 1 | 1 | 1 | 0 | 1 |
| 2064 | FE | 1 | 1 | 1 | 1 | 1 | 1 | 1 | 0 |
| 2065 | FF | 1 | 1 | 1 | 1 | 1 | 1 | 1 | 1 |

*FIG. 2E*

| | | | | | |
|---|---|---|---|---|---|
| 99 | AA | BB | CC | DD | EE |
| 9A | AB | BC | CD | DE | EF |
| 9B | AC | BD | CE | DF | F6 |
| 9C | AD | BE | CF | E6 | F7 |
| 9D | AE | BF | D6 | E7 | F8 |
| 9E | AF | C6 | D7 | E8 | F9 |
| 9F | B6 | C7 | D8 | E9 | FA |
| A6 | B7 | C8 | D9 | EA | FB |
| A7 | B8 | C9 | DA | EB | FC |
| A8 | B9 | CA | DB | EC | FD |
| A9 | BA | CB | DC | ED | FE |
| | | | | | FF |

*FIG. 3*

METHOD AND APPARATUS FOR PROVIDING CALENDAR YEAR DATES BY FORMING HEXADECIMAL DATES HAVING TWO DIGITS

In the past, a calendar date up to 99 was stored in a computer memory. The two base-ten digits were used to store calendar dates from (19)00 to (19)99, where the (19) was only implicitly understood.

In the present invention a hexadecimal date up to (20)65 can be stored in two four-bit memory blocks. The hexadecimal date is stored by means of a base-ten digit and a hexadecimal digit taken together, and by means of a hexadecimal digit and a base-ten digit taken together, and by means of two hexadecimal digits taken together. Two hexadecimal digits taken together can extend the hexadecimal date to FF. The stored hexadecimal date can reach past calendar year (19)99 to calendar year (20)65. A so-called "year 2000 problem" can be put off for sixty five years by means of the present invention.

In the past, a two digit date used eight memory cells. Each memory cell is also known as a location, memory location or bit location. The eight memory cells would hold a base-ten number having two digits. Thus the date 99 would be supported by a memory block Z having eight bit locations Z1Z2Z3Z4Z5Z6Z7Z8. were Z1 etc. is a memory location.

In the past, the memory block Z contained binary values that went up to value 1001, to store a left digit of a two digit calendar date. Similarly the memory block Z contained binary values that went up to value 1001, to store a right digit of a two digit calendar date. Thus Z1Z2Z3Z4 only contained binary value up to 1001 while Z5Z6Z7Z8 only contained binary values up to 1001.

In the present invention, a binary value in left memory block X goes from 1001 to 1010 to 1011 to 1100 to 1101 to 1110, up to a binary value 1111. A final binary value in memory block \X is 1111. Thus X1X2X3X4=1111. That is, bit location X1, bit location X2, bit location X3 and bit location X4 of memory block X, taken together, can have binary values past 1001, up to the binary value 1111. This binary value corresponds to hexadecimal digit F. The left portion of a two digit hexadecimal date that exceeds date 99 can thus be expressed by using the hexadecimal digits A, B, C, D, E and F as well as the base-ten digit 9.

Also, in the present invention, a binary value in right memory block Y goes from 0110 up to a value of 1111. At this point Y1Y2Y3Y4=1111. That is, bit location Y1, bit location Y2, bit location Y3 and bit location Y4 of memory block Y, take together can have binary values from 0110 to 1111. Again this latter binary value corrsespondes to hexadecimal digit F. The right portion of the two digit hexadecimal date that exceeds date 99 can be express using the hexadecimal digits A, B, C, D, E and F as well as the base-ten digits 6, 7, 8, and 9.

SUMMARY OF THE INVENTION

The present invention includes a method for storing a hexadecimal date having two digits, the hexadecimal date beginning with 9A, comprising placing a four bit binary number having the value 1001 that corresponds to the base-ten digit 9 in a left memory block comprising four memory locations and placing a four bit binary number having a value corresponding to a hexadecimal digit selected from the group A, B, C, D, E and F in a right memory block comprising four memory locations.

DESCRIPTION OF THE DRAWING

FIG. 2 shows a calendar date, a corresponding hexadecimal date and the bits for memory blocks X any Y for calendar years from (20)00 to (20)65, with calandar year (19)99 being shown for reference purposes.

FIG. 3 shows hexadecimal dates from 9A to FF with base-ten date (19)99 being shown for reference purposes.

DESCRIPTION OF THE PREFERRED EMBODIMENT

Figure 1:
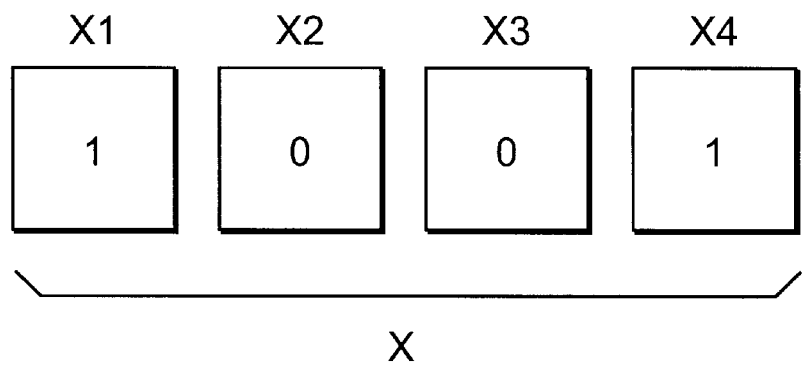
FIG. 1 shows two four-bit memory blocks, a left four bit memory block X and a right four-bit memory block Y, the two four-bit memory blocks storing hexadecimal date 9A.
Figure 1:
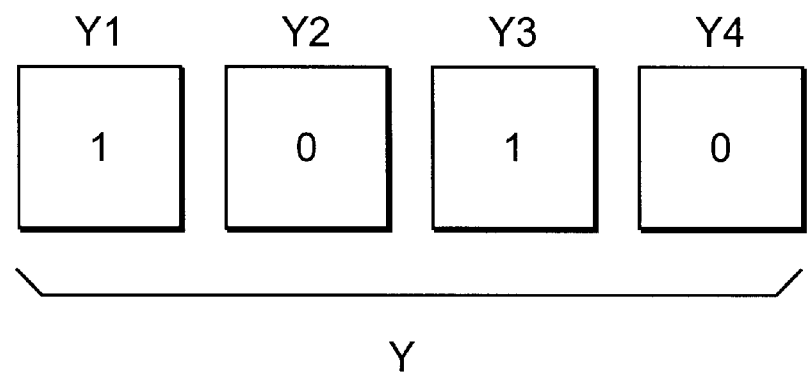

A first four-bit memory block X is shown in FIG. 1. The memory block X is shown as storing the four bits 1001 of the left portion 9 of the hexadecimal date 9A. The memory block X has a memory bit location X1. X1 could be a memory device such as a flip-flop, a programmable read-only memory device or another memory device that can store a bit of binary information. Block X also has a memory device X2, a memory device X3 and a memory device X4. The memory block X is assigned to hold the left portion of a two digit hexadecimal date, such as the 9 of hexadecimal date 9A. The memory block X is called the left memory block only because it stores the left digit of a two digit hexadecimal date. The value of a binary bit stored in memory device X1 can be changed from 0 to 1 or from 1 to 0. Similarly, the values stored in devices X2, X3 and X4 can be 0 or 1 in binary value. Left memory block X can be made up from four widely separated memory cells.

A second four-bit memory block Y is also shown in FIG. 1. The memory block Y is shown as storing the four bits of the right portion A of the hexadecimal date 9A. The memory block Y has a memory bit location Y1. Y1 could be a memory device such as a flip-flop, a programmable read-only memory device or other memory device that can store a bit of binary information. The memory block Y is assigned to hold the right digit, such as the hexadecimal digit A, of a two digit hexadecimal date, such as the A of hexadecimal date 9A. The memory block Y is called the right memory block only because it stores the right digit of a two digit hexadecimal date. The right memory block Y has a memory device Y2, a memory device Y3 and a memory device Y4. The value of a binary bit stored in memory device Y1 can be changed from 0 to 1 or from 1 to 0. Similarly the values stored in devices Y2, Y3 and Y4 can be 0 or 1 in binary value. Right memory block Y can be made up from four widely separated memory cells.

FIG. 2 shows values given to devices X1, X2, X3 and X4 of memory block X, to provide the left digit of a hexadecimal date, the value of the hexadecimal date extending past 99 to a hexadecimal date FF. FIG. 2 also shows values given to devices Y1, Y2 Y3 and Y4 of memory block Y, to provide the right digit of a hexadecimal date, the value of the hexadecimal date extending past 99. The hexadecimal date can go up to (20)65 instead of stopping at (19)99. This ability of memory blocks X and Y, taken together, to store a hexadecimal date past 99, is shown in FIG. 2.

In FIG. 2 the first, that is left, memory block X can have binary bit values 1001, 1010, 1011, 1100, 1101, 1110 and 1111. In FIG. 2 the second, that is right, memory block Y can have the binary bit values 0110, 0111, 1000, 1001, 1010, 1011, 1100, 1101, 1110 and 1111.

FIG. 3 shows a base-ten bit plus a hexadecimal bit, a hexadecimal bit plus a hexadecimal bit and a hexadecimal bit plus a base-ten bit that are the disclosed two-bit hexadecimal dates that extend past calendar date 99. The two bit hexadecimal dates progress up to and include hexadecimal date FF, this latter hexadecimal date corresponding to calendar date (20)65.

The invention may be embodied in other specific forms without departing from the spirit or essential characteristics thereof. The present embodiment is therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A method for providing calendar year dates by forming hexadecimal dates having two digits, the hexadecimal dates beginning with 9A, comprising:
    (a) forming a series of hexadecimal dates, the series increasing from 9A to 9F, by placing a four bit binary number, having the value 1001, that corresponds to base-ten digit 9, in a left memory block comprising four memory locations, and by successively placing a four bit binary number having a value corresponding to a hexadecimal digit selected successively from group A, B, C, D, E and F, in a right memory block comprising four memory locations; and
    (b) relating each formed hexadecimal date of the series 9A to 9F, respectively to a calendar year date from 2000 to 2005.

2. A method for providing calendar year dates by forming hexadecimal dates having two digits, the hexadecimal dates beginning with A6, comprising:
    (a) forming a series of hexadecimal dates, the series increasing from A6 to FF, by placing a four bit binary number having a value corresponding to a hexadecimal digit selected successively from a first group comprising A, B, C, D, E and F, in the left memory block that comprises four memory locations, and, for each successive hexadecimal digit selected from the first group, placing a four bit binary number having a value corresponding to a digit selected successively from a second group comprising 6, 7, 8, 9, A, B, C, D, E and F, in the right memory block that comprises four memory locations; and
    (b) relating each formed hexadecimal date of the series A6 to FF, respectively to a calendar year date from 2006 to 2065.

3. Apparatus for providing calendar year dates by forming hexadecimal dates having two digits, the hexadecimal dates beginning with 9A, comprising:
    (a) a four bit binary number having a value 1001 that corresponds to base-ten digit 9, in a left memory block that comprises four memory locations;
    (b) a four bit binary number having a value that corresponds to a hexadecimal digit successively selected from the group A, B, C, D, E and F, in a right memory block that comprises four memory locations; and
    (c) a record for relating each formed hexadecimal date, of a formed series 9A to 9F, respectively to a calendar year date from 2000 to 2005.

4. A method for providing calendar year dates, by forming hexadecimal dates having two digits, the hexadecimal dates beginning with 9A, comprising:
    (a) forming a series of hexadecimal dates, the series increasing from 9A to 9B, by placing a four bit binary number, having the value 1001, that corresponds to base-ten digit 9, in a left memory block comprising four memory locations, and by successively placing a four bit binary number having a value corresponding to a hexadecimal digit selected successively from group A and B, in a right memory block comprising four memory locations; and
    (b) relating each formed hexadecimal date of the series 9A to 9B, respectively to a calendar year date from 2000 to 2001.

5. A method for providing calendar year dates by forming hexadecimal dates having two digits, the hexadecimal dates beginning with 9A, comprising:
    (a) forming a series of hexadecimal dates, the series increasing from 9A to 9C, by placing a four bit binary number, having the value 1001, that corresponds to base-ten digit 9, in a left memory block comprising four memory locations, and by successively placing a four bit binary number having a value corresponding to a hexadecimal digit selected successively from group A, B and C, in a right memory block comprising four memory locations; and
    (b) relating each formed hexadecimal date of the series 9A to 9C, respectively to a calendar year date from 2000 to 2002.

6. A method for providing calendar year dates, by forming hexadecimal dates having two digits, the hexadecimal dates beginning with 9A, comprising:
    (a) forming a series of hexadecimal dates, the series increasing from 9A to 9D, by placing a four bit binary number, having the value 1001, that corresponds to base-ten digit 9, in a left memory block comprising four memory locations, and by successively placing a four bit binary number having a value corresponding to a hexadecimal digit selected successively from group A, B C and D, in a right memory block comprising four memory locations; and
    (b) relating each formed hexadecimal date of the series 9A to 9D, respectively to a calendar year date from 2000 to 2003.

7. Apparatus for providing calendar year dates by forming hexadecimal dates having two digits, the hexadecimal dates beginning with 9A, comprising:
    (a) a four bit binary number having a value 1001 that corresponds to base-ten digit 9, in a left memory block that comprises four memory locations;
    (b) a four bit binary number having a value that corresponds to a hexadecimal digit successively selected from the group A and B, in a right memory block that comprises four memory locations; and
    (c) a record for relating each formed hexadecimal date, of a formed series 9A to 9B, respectively to a calendar year date from 2000 to 2001.

8. Apparatus for providing calendar year dates by forming hexadecimal dates having two digits, the hexadecimal dates beginning with 9A, comprising:
    (a) a four bit binary number having a value 1001 that corresponds to base-ten digit 9, in a left memory block that comprises four memory locations;
    (b) a four bit binary number having a value that corresponds to a hexadecimal digit successively selected from the group A, B and C, in a right memory block that comprises four memory locations; and
    (c) a record for relating each formed hexadecimal date, of a formed series 9A to 9C, respectively to a calendar year date from 2000 to 2002.

9. Apparatus for providing calendar year dates by forming hexadecimal dates having two digits, the hexadecimal dates beginning with 9A, comprising:
    (a) a four bit binary number having a value 1001 that corresponds to base-ten digit 9, in a left memory block that comprises four memory locations;
    (b) a four bit binary number having a value that corresponds to a hexadecimal digit successively selected from the group A, B, C and D, in a right memory block that comprises four memory locations; and
    (c) a record for relating each formed hexadecimal date of a formed series 9A to 9D, respectively to a calendar year date from 2000 to 2003.

* * * * *